United States Patent
Mueller-Marc et al.

(10) Patent No.: US 8,462,422 B2
(45) Date of Patent: Jun. 11, 2013

(54) SECURITY ELEMENT

(75) Inventors: Oliver Mueller-Marc, Appenzell (CH); Frank Bartels, Hattingen (DE); Karlheinz Blankenbach, Pforzheim (DE); Juergen Rawert, Neuss (DE); Andriy Bitman, Dortmund (DE); Dieter Jerosch, Bad Soden (DE)

(73) Assignee: Advanced Display Technology AG, Appenzell (CH)

( * ) Notice: Subject to any disclaimer, the term of this patent is extended or adjusted under 35 U.S.C. 154(b) by 124 days.

(21) Appl. No.: 13/036,237

(22) Filed: Feb. 28, 2011

(65) Prior Publication Data

US 2011/0216391 A1   Sep. 8, 2011

(30) Foreign Application Priority Data

Mar. 2, 2010  (DE) .......................... 10 2010 009 890

(51) Int. Cl.
*G02B 26/00*  (2006.01)
(52) U.S. Cl.
USPC .......................................... 359/290
(58) Field of Classification Search
USPC .................. 359/290–295, 665, 666
See application file for complete search history.

(56) References Cited

U.S. PATENT DOCUMENTS

| | | | |
|---|---|---|---|
| 7,310,080 B2 | 12/2007 | Jessop | |
| 7,499,223 B2 * | 3/2009 | Berge et al. | 359/666 |
| 8,231,249 B2 * | 7/2012 | Tsuboi et al. | 362/317 |
| 2007/0217022 A1 * | 9/2007 | Kuiper et al. | 359/666 |
| 2009/0042065 A1 | 2/2009 | Simon et al. | |
| 2012/0154886 A1 * | 6/2012 | Heikenfeld et al. | 359/228 |

FOREIGN PATENT DOCUMENTS

| | | |
|---|---|---|
| DE | 10 2007 063 343 A1 | 7/2009 |
| DE | 10 2008 020 133 A1 | 10/2009 |
| EP | 1 090 384 B1 | 1/2000 |

* cited by examiner

*Primary Examiner* — Tuyen Tra
(74) *Attorney, Agent, or Firm* — Marshall & Melhorn, LLC

(57) ABSTRACT

The invention relates to a security element including at least one display element for non-resettable visible display of information, wherein said display element comprises a first and a second volume which are fluidically connected via at least one duct, and only one electrically controllable electrode which is associated to one of said volumes and is configured, when charged with an electric voltage, to vary the surface tension of a liquid which is present in said associated volume, wherein said liquid comprises at least an electrically conducting and/or polar and a non-polar fraction, and at least said electrically conducting fraction being completely and in a stable manner provided in that of both volumes which is not associated with an electrode and wherein said electrically conducting and/or polar fraction may be moved irreversibly and at least partly due to a single charging of the electrode into the volume which is associated with an electrode.

11 Claims, 2 Drawing Sheets

SECURITY ELEMENT

BACKGROUND OF THE INVENTION

The invention relates to a security element comprising at least one display element for visual display of information which cannot be reset.

It is known to realize display devices with the aid of colored liquids which may be displaced between positions which are not visible and visible for a viewer. An efficient means for displacing liquids is the so-called electrowetting wherein voltage is supplied to an electrode which is immediately adjacent to a liquid droplet, so that surface energy and therefore surface tension of the liquid is increased. Depending on the configuration, this may cause that the liquid spreads over the electrode or even covers it completely, depending on the geometry and nature of surface of the electrode and relative position of liquid and electrode also with respect to the earth gravity field. It is known to provide the electrodes with a hydrophobic coating in order to achieve a maximum effect in this way between the state of the liquid when the electrode is not charged and the electrode is charged. It is possible already with these aforementioned means to realize a droplet movement without reverting to further functional elements.

In case of a single droplet, variation of the surface energy causes a variation of the contact angle at which the droplet is wetting its support. The interrelation between field strengths and variation of contact angle is described by the Lipmann-Young equation and is known to the skilled person.

Thus, by a local variation of the electric field strength, the local surface energy of the liquid and therefore the geometry of a droplet can be varied locally. In particular, a movement of the droplet can occur by creation of a locally increased surface energy, so that it preferably extends into the corresponding region characterized by the presence of an electric field. Contrarily, liquid is pushed out of a region in which it is not influenced and therefore comprises a lower surface energy since it tends to the geometry of lowest energy, namely that of a sphere, in this region. A net transport of liquid from the region of lower into the region of higher field strength results thereby.

A plurality of different display devices is already realized on this basis. Typically, it was always the objective to produce an electronically controllable bistabile display element which selectively assumes one state or the other. Thus, it is for example known to reciprocate a liquid between a first and a second volume which are connected via a duct with the aid of the effect of electrowetting, wherein each volume comprises an associated electrode so that the transport direction results respectively from the ratio of field strengths between both electrodes. It is preferred to supply potential to only that electrode in which direction the liquid is to be conveyed.

For realizing a security element, it is desirable, for example, to uncover or to prevent an undesired manipulation, that a change of state which has once occurred cannot be reversed.

If this would be possible on basis of the electrowetting technology described in the introductory, the whole wealth of experience documented in the prior art could be used to realize security elements which for example display exceeding of storage temperatures by means of a color change by displacing a colored fluid in a very simple and intuitive manner. Thus, the often technically complex devices which had been used for the aforementioned purposes until now, could be renounced which furthermore often are not able to guard against manipulation without permission.

A display device which cannot be reset is for example known from U.S. Pat. No. 7,310,080 B2, wherein non-resettability is achieved by the fact that a lens cannot be displaced from a position once assumed in which for example a text message can be read, back to a starting position. It can further be taken from the reference that fixation of the lens can be made by means of any locking devices, without specifying them in detail.

US 2009/0042065 A1 discloses a security element wherein a porous barrier fluidically separates a first and a second volume. An electrolyte is provided in said first volume which, due to a security relevant event, passes the barrier and contacts electrodes in said second volume. Due to a chemical reaction between electrolyte and electrode, an electric voltage drop occurs at the electrodes that serves as an indicator of the security relevant event.

DE 10 2008 020 133 A1 discloses a security display element wherein two volumes are connected via a duct, wherein a unified electrode covers both volumes as well as the connecting duct.

SUMMARY OF THE INVENTION

Therefore, it is the object of the invention to propose a security element which uses the known electrowetting technology, which offers a non-resettable visual display of security relevant information, is easily readable, flexible in application and can be produced at low cost and simultaneously does not allow any manipulations.

This object is solved according to the invention by a security element of patent claim 1. Preferred embodiments are subject matter of the dependent claims.

In the security element of the invention including at least one display element for non-resettable visual display of information, said display element comprises:
  a first and a second volume which are fluidically connected via at least one duct, wherein one volume is visible and the other one is non-visible; and
  only one electrically controllable electrode which is associated to only one of said volumes and which is configured, when charged with an electric voltage, to vary the surface tension of a liquid which is present in the associated volume;
  wherein said liquid comprises at least one electrically conducting and/or polar and one non-polar fraction and at least said electrically conducting and/or polar fraction is completely and in a stable manner provided in that one of both volumes which is not associated with the electrode and wherein said electrically conducting and/or polar fraction is non-reversibly and at least partly due to a singular charging of the electrode, movable into the volume which is associated with the electrode.

It is clear for the skilled person that the security element according to the invention is exclusively limited to technical means known to him which can be taken from the prior art for utilizing the effect of electrowetting. Merely as an example, reference is made to EP 1 090 384 B1 relating to a reflective display device utilizing the effect of electrowetting. A security display element for binary information is known from DE 10 2008 020 133 A1 which equally is based on the effect of electrowetting and discloses a plurality of constructive details which will also be useful for the skilled person when embody the present invention. Likewise, DE 10 2008 020 130 A1 relates to a fluidic multi-color display device having constructional features which may also contribute to realize the disclosed security element. DE 10 2007 063 343 A1 relates to the use of a fluid mixture for electrowetting and will be an aid for the skilled person for selecting suitable liquids for realizing the security element according to the invention.

By utilizing an electrowetting display element known from the prior art subject matter of the present invention may be achieved by the measure that an electrode is associated with only one of the respective two volumes which are fluidically connected via a duct. It is also conceivable to realize the security element according to the invention by use of known electrowetting display elements wherein those electrodes which are necessary to drive into one of two conveying directions are not embodied or are not controllable, respectively.

According to the invention, it is provided that at least said electrically conducting and/or polar fraction of the liquid is provided in the volume which is not associated with an electrode. Depending on the embodiment, a single activating pulse which effects electrical charging of the electrically controllable electrode may be sufficient to convey this liquid fraction into the volume which is associated with an electrode. Since no electrode is associated to the volume in which the polar liquid fraction was stored before occurrence of the activating pulse, return of the liquid is not possible without destroying the security element. Return of the liquid by bouncing, beating, shaking or the like can be limited to very high values of G by a correspondingly narrow configuration of the duct. It is equally possible to confer an appropriately configured transition structure to the duct which prevents return. Further details in respect thereto may be found in the description below.

According to the invention, either the first or the second volume is visible and the respective other one is non-visible. In this way it is for example possible to realize a security element by utilizing a colored electrically conducting and/or polar fraction of the liquid wherein color information is displayed or not displayed, respectively, depending on the state of the security element. It is preferred to provide the electrically conducting and/or polar fraction of the liquid in said non-visible volume.

Depending on the embodiment it may be appropriate that the electrically conducting and/or polar fraction of the liquid is a colored aqueous solution and the non-polar fraction of the liquid is a carrier liquid which is immiscible with the electrically conducting and/or polar fraction. It is in particular preferred that the carrier liquid is transparent or approximately transparent. Preferably, the electrically conducting and/or polar fraction is a polyethylene carbonate.

Depending on the embodiment, the first and the second volume may be arranged in a common plane or in different planes. For realizing very flat security elements which for example should find their application as adhesive labels, it is appropriate to arrange the volumes in a common plane side by side so that also the duct connecting the volumes lies within the common plane.

In another embodiment of the invention, said first and said second volume are located in different planes. In this way, it is for example possible that both volumes are arranged one above the other so that said visible volume just hides the non-visible one.

Depending on the preferred embodiment of the security element according to the invention, it may be appropriate that said first and said second volume are connected via a bent or a buckled duct. This embodiment is suitable for volumes which are present in a common plane, as well as for volumes which are located in different planes. Bent or buckled connecting ducts in particular have the advantage that they make a manipulation of the security element by bumping, shaking or the like difficult.

To impede manipulation of the security element of the invention, wherein manipulation here is to be understood as the attempt to reset a security element which once has been activated, in a further embodiment of the invention, the duct comprises a one-way valve having a forward direction from the volume without associated electrode to the volume with associated electrode. Thereby, it can be provided that the effect of said valve is interrupted for liquid exchange when the electrode is charged.

In a further embodiment, security against manipulation is increased in that the material of the inner surface of the duct is harmonized with the electrically conducting and/or polar fraction, so that it does not wet the inner surface of the duct as long as the electrode is not charged. This embodiment therefore utilizes the effect of capillary depression.

In a further embodiment of the invention it is provided that said volume having an associated electrode includes a substance which chemically reacts with said electrically conducting and/or polar fraction in said visible volume to form a colored reaction product when said electrically conducting and/or polar fraction is conveyed into the volume having an associated electrode due to charging of the electrode. In this way it is for example also possible to use a liquid wherein the electrically conducting and/or polar fraction is transparent or only weakly colored. Moreover, this embodiment may be realized with display elements wherein only one volume or both volumes are visibly embodied.

In a further development of the aforementioned embodiment it is provided that at least reaction product comprises a higher viscosity than the electrically conducting and/or polar fraction of the color or confers a higher tenacity to the electrically conducting and/or polar fraction. This embodiment comprises an increased security level against manipulation.

Principally, the volumes provided according to the invention which are fluidically connected via a duct, may be embodied by a single, correspondingly large volume comprising an obstruction which separates said volume into two sub-volumes.

BRIEF DESCRIPTION OF THE DRAWINGS

Further details of the invention are described with reference to the following figures. It is shown in.

DETAILED DESCRIPTION OF THE INVENTION

Figure 1:
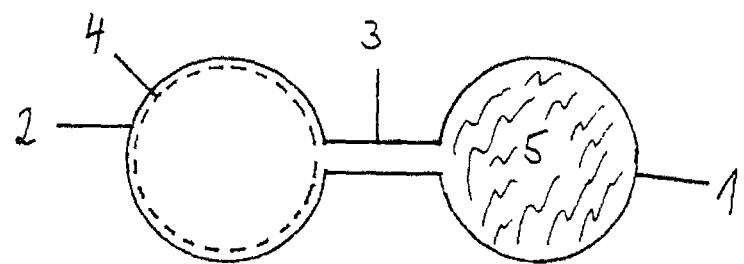
FIG. 1 a security element according to the invention having only one display element.

FIG. 1 shows a schematic representation of a security element according to the invention comprising only one display element. Therein, said display element comprises a first volume 1 and a second volume 2 which are fluidically connected via a duct 3. Second volume 2 includes an electrode 4 which is denoted by a dashed line. Since in the illustration liquid 5 is still present in volume 1 which is not associated with electrode 4, security element of FIG. 1 is in a non-activated state.

For sake of completeness it should be mentioned that the representation of FIG. 1 as well as of the following figures merely disclose those features which are relevant for understanding the invention. Thus, for example, the control circuitry for electrode or optional substrates or covering elements, respectively, which sandwich the security element according to the invention are not represented. For example, it may be provided to form said security element of FIG. 1 between two rigid or flexible substrates, wherein at least one substrate is transparent at least in the region of the second volume 2.

Figure 2:
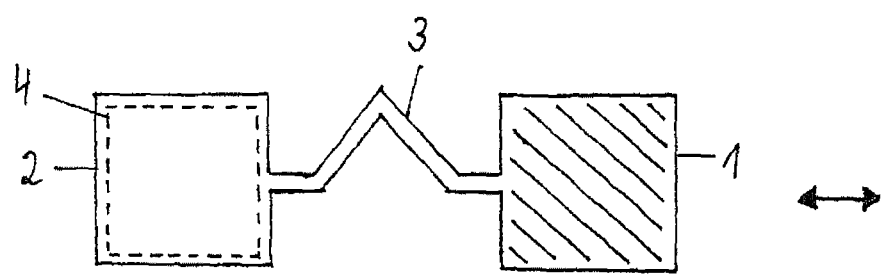
FIG. 2 a display element having a buckled duct.

FIG. 2 shows a further embodiment wherein first volume 1 and second volume 2 are connected via a buckled duct 3. While second volume 2 again comprises electrode 4, first volume is non-visible which is made clear by hatching. Since duct 3 is buckled, the represented security element is protected to be manipulated by accelerated movements in direction of the arrows, for example by shaking.

Figure 3:
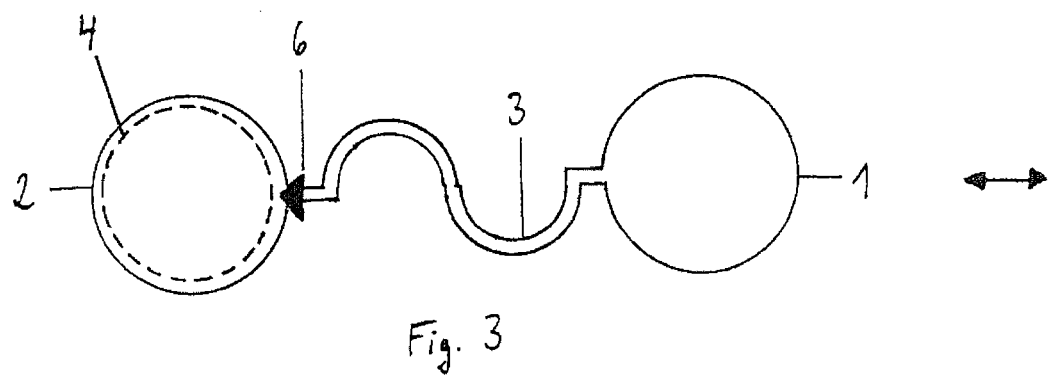
FIG. 3 a display element having a curved duct.

FIG. 3 shows a further embodiment of a display element wherein again a first volume 1 is connected to a second volume 2 including an electrode 4 via a curved duct 3. As already seen in the embodiment of FIG. 2, the curved path of duct 3 is provided to protect the represented display element of manipulation attempts, such as shaking in direction of the arrows. Additionally, the represented embodiment comprises a one-way valve 6 located at the transition between duct 3 and second volume 2. It should be mentioned that one-way valve 6 must not be necessarily provided in combination with a curved or buckled duct 3, but may also serve as a sole means for preventing manipulation. Moreover, valve 6 may be arranged at any position of duct 3. Appropriately, valve 6 has a forward direction toward second volume 2. In this way it is ensured that, effected by an activating pulse, liquid which has once been conveyed from first volume 1 into second volume 2 cannot be conveyed back into first volume 1.

Figure 4:
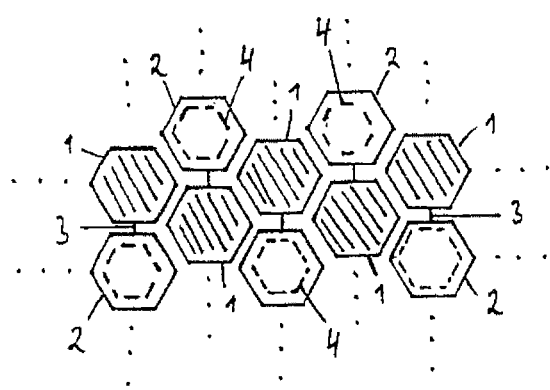
FIG. 4 a sectional view of a security element comprising a plurality of display elements.

FIG. 4 shows a section of a security element according to the invention comprising a plurality of display elements, such as according to FIGS. 1 to 3. If the electrodes 4 can be commonly controlled and thus, are electrically connected, it is possible, with the aid of such a security element, to output complex information, for example a symbol or a word, in response to an activating pulse.

REFERENCE NUMERAL LIST

1. First volume
2. Second volume
3. Duct
4. Electrode
5. Liquid
6. One-way valve The features disclosed in the foregoing description, in the claims and/or in the accompanying drawings may, both separately and in any combination thereof, be material for realising the invention in diverse forms thereof.

What is claimed:

1. A security element including at least one display element for non-resettable visual display of information, wherein said display element comprises:

first and second volumes which are fluidically connected via at least one duct, wherein one of said first and second volumes is covered and the other one is not covered; and only one electrically controllable electrode which is associated only to the first volume and which is configured, when charged with an electric voltage, to vary the surface tension of a liquid which is present in the first volume, wherein the second volume comprises no associated electrode;

wherein said liquid comprises at least one electrically conducting and/or polar and one non-polar fraction and at least said electrically conducting and/or polar fraction is completely and in a stable manner provided in the second volume which is not associated with the electrode, and wherein said electrically conducting and/or polar fraction is non-reversibly and at least partly due to a singular charging of the electrode, movable into the first volume which is associated with the electrode.

2. The security element of claim 1, wherein said electrically conducting and/or polar fraction of liquid is provided in said covered volume.

3. The security element of claim 1, wherein said first and said second volumes are arranged in a common plane.

4. The security element of claim 1, wherein said first and said second volume are arranged in different planes.

5. The security element of claim 4, wherein said first and said second volumes are connected via a bent or a buckled duct.

6. The security element of claim 1, wherein said first and said second volumes are connected via a bent or a buckled duct.

7. The security element of claim 1, wherein said duct comprises a one-way valve having a forward direction from said volume without associated electrode to said volume with associated electrode.

8. The security element of claim 1, wherein material of an inner surface of said duct is matched to said electrically conducting fraction so that it does not wet the inner surface of the duct as long as said electrode is not being charged.

9. The security element of claim 1, wherein said volume with associated electrode includes a substance which chemically reacts with said electrically conducting and/or polar fraction in said not covered volume to form a colored reaction product, when said electrically conducting and/or polar fraction is conveyed into said volume with associated electrode caused by charging said electrode.

10. The security element of claim 9, wherein at least one reaction product comprises a higher viscosity than said electrically conducting and/or polar fraction of the liquid or confers higher tenacity to said electrically conducting and/or polar fraction.

11. The security element of claim 1 and embodied by utilization of an electrowetting display element for reversible liquid transport, wherein only one of the respective two fluidically connected volumes comprises said electrically controllable electrode.

\* \* \* \* \*